Sept. 20, 1966   H. ZIRNGIBL ETAL   3,273,312
PROCESS FOR DRYING GASES WHICH CONTAIN HYDROGEN CHLORIDE
Filed May 18, 1964
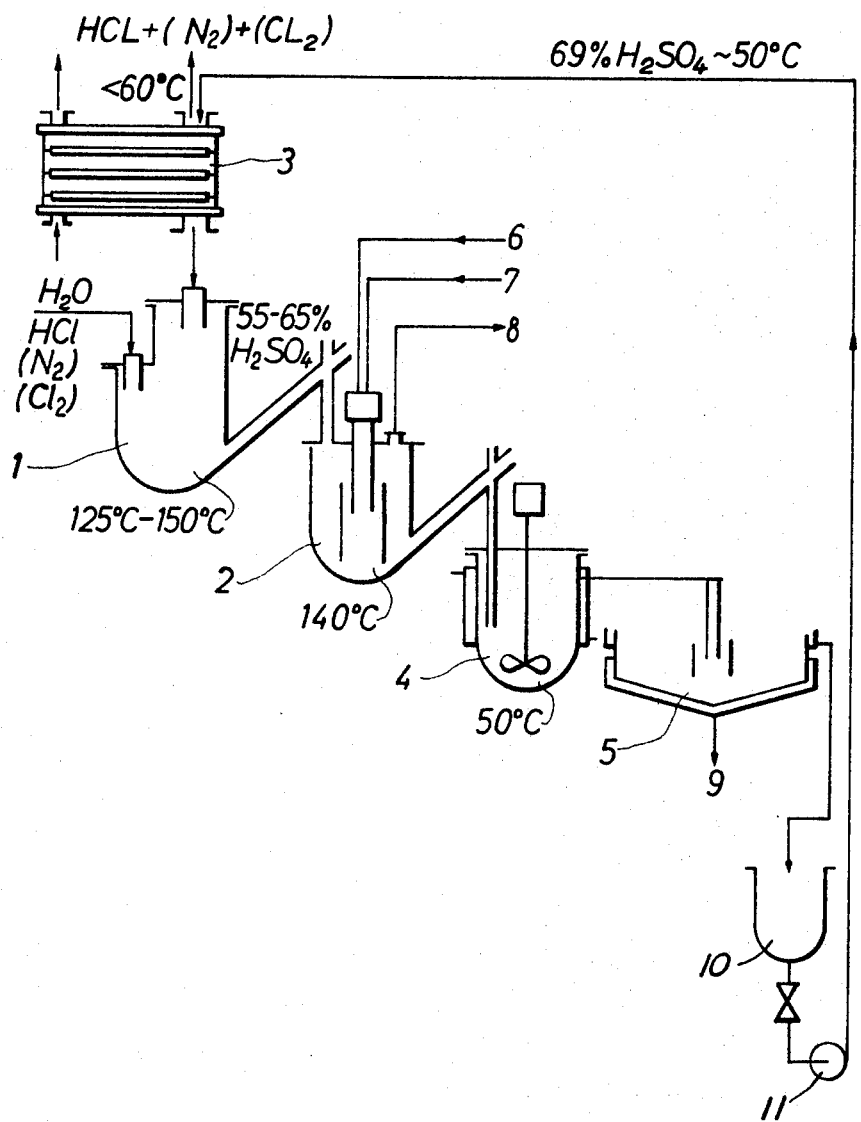
INVENTORS:
HANS ZIRNGIBL, JAKOB RADEMACHERS.
BY
ATTORNEYS

United States Patent Office 3,273,312
Patented Sept. 20, 1966

3,273,312
PROCESS FOR DRYING GASES WHICH CONTAIN HYDROGEN CHLORIDE
Hans Zirngibl, Duisburg, and Jakob Rademachers, Krefeld, Germany, assignors to Farbenfabriken Bayer Aktiengesellschaft, Leverkusen, Germany, a German corporation
Filed May 18, 1964, Ser. No. 367,994
Claims priority, application Germany, May 28, 1963, F 39,857
6 Claims. (Cl. 55—31)

The present invention relates to a continuous process for drying, by means of sulfuric acid, gases which contain hydrogen chloride and which may possibly also contain solid substances.

It is an object of the present invention to provide a new and economic process for drying gases which contain hydrogen chloride.

It is another object of the present invention to provide a process for drying gases containing hydrogen chloride which can be performed continuously.

It is a further object of the present invention to provide a process for drying gases containing hydrogen chloride in which process the corrosion problems are reduced to the possible minimum.

It is a further object of the present invention to provide a process for drying gases containing hydrogen chloride by sulfuric acid which acid is recycled after regeneration.

It is still another object of the present invention to provide a process for drying gases consisting of wet hydrogen chloride as well as gases which contain hydrogen chloride besides e.g. chlorine, inert gases, water vapor and other gaseous, liquid or solid impurities.

Still further objects of the invention may become apparent as the description proceeds.

All the previously known process for producing or working up anhydrous hydrogen chloride gas by means of sulfuric acid have the disadvantage that considerable difficulties arise from corrosion and the processes necessary for regenerating the dilute sulfuric acid which is thereby formed are also difficult. In order to avoid these difficulties, other less economical drying agents, for example, boric oxide or metaboric acid, have more recently been employed, but these drying agents are not suitable for gases which contain solids.

The process according to the invention for drying gases which contain hydrogen chloride makes it possible, by maintaining specific conditions, to employ sulfuric acid without hindrance arising from the difficulties mentioned above. The invention provides a process in which the gas containing water vapor and hydrogen chloride is dried in an absorption apparatus by a counter-current of semi-concentrated sulfuric acid which is conveyed in circulation, the heat which is produced being dissipated, so that the temperature at the head of the absorption apparatus is at most 60° C. The concentration of $H_2SO_4$ in the sulfuric acid running into the absorption apparatus should be about 65 to 70% by weight, advantageously 68% by weight, while the discharging sulfuric acid should have an $H_2SO_4$ concentration of 55% by weight or more and temperature as far as possible in the vicinity of its boiling point.

The resulting dilute sulfuric acid, with an $H_2SO_4$ content of 55% by weight or more is conducted, while still hot, over an overflow, preferably into an evaporator heated by a submerged burner, is concentrated therein to an $H_2SO_4$ content of about 65 to 70% by weight, advantageously 68% by weight, after being cooled, freed from possibly occurring solid substances and finally recycled to the absorption apparatus.

The temperature at the head of the absorption apparatus must consequently be 60° C. or lower in the range of about 15 to 60° C., preferably in the range of about 40 to 60° C., because otherwise there is incomplete drying. This temperature can be maintained by dissipating the heat which is evolved in the absorption apparatus by means of a coolant, for example water, by indirect cooling or in direct exchange by admitting more of the colder 65 to 70% inflowing sulfuric acid.

In this latter instance, the indirect cooling takes place in the condenser connected after the immersion heater. In addition, the content of $H_2SO_4$ in the more dilute sulfuric acid that is discharged is not as low as it is when a smaller quantity of the cyclic acid is used per unit of volume of the hydrogen chloride gas passing through.

The concentration of $H_2SO_4$ in the sulfuric acid discharged should not fall below 55% by weight, since the content of HCl which remains in the sulfuric acid increases appreciably with lower $H_2SO_4$ concentrations. The HCl content likewise rises with decreasing temperature of the discharging acid. An HCl content of 0.05% by weight, corresponding to an HCl loss of 0.15% was established in 55% by weight sulfuric acid discharging at 125° C.

The concentration of the discharged sulfuric acid can be in the range of about 55 to about 65% by weight. The boiling points of these acids are in the range of about 130 to 155° C.; they are however lowered by about 10° C. by the absorbed or dissolved impurities (inert gases included). The temperature of the discharged sulfuric acid can be about 5° C. lower than the boiling points of said acids, and accordingly the temperature range of the discharged acids is in the range of about 115 to 150° C.

The concentration of the inflowing acid should not be above 70% by weight of $H_2SO_4$ since then appreciable amounts of $SO_3$ are found in the exhaust gases of the evaporators heated by submerged burners.

The absorption apparatus can with advantage be made of graphite and be constructed as a plate cooler, or a lens cooler or even as a filler-body column. When using filler-body columns, and passing through HCl gas at reasonable empty tube velocities, the trickling density of the sulfuric acid to be supplied is relatively small. Therefore it is advisable to provide for a better substance exchange in the final phase by means of a fitted plate column. For the same reason, when using a plate cooler, the overflows from plate to plate are expediently provided with bubble caps.

The hot hydrogen chloride gases containing water vapour are advantageously introduced into a retort, in which the dilute sulfuric acid accumulates. The temperature of the hot gases is reduced in the retort. The retort is rubberized and lined in acid-resistant manner, has a gas inlet which compels the gases to enter into the acid, and also a steadying chamber on the side of the ascending gases in order to separate out any entrained drops.

The dilute acid is expediently concentrated in an evaporator heated by a submerged burner of known design. If a heater construction according to Belgian Patent 589,339 is used, the calorific energy can be applied in very economic manner by burning bunker oil.

The process according to the invention can be employed for drying both pure hydrogen chloride gases and also those gases which contain, in addition to hydrogen chloride, other gases, such as chlorine or nitrogen, which are inert with respect to sulfuric acid. Such gases result, for example from the Deacon process.

The process according to the invention is particularly suitable for drying those gases which contain hydrogen chloride and which also contain, as well as inert gas fractions, entrained solids, such as are formed for example, by the thermal decomposition of $FeCl_2 \cdot 4H_2O$. The iron oxide dust particles that are entrained are washed out of the gas stream, by the sulfuric acid, are converted by this acid into iron sulfate, which precipitates as the monohydrate when the sulfuric acid is concentrated in the evaporator. The monohydrate is separated out, after cooling, in a following concentrator.

The process is hereinafter more fully described by reference to examples and to the single figure of the accompanying drawings.

*Example 1*

A gas mixture, with a temperature of 400° C., formed by the decomposition of $FeCl_2.4H_2O$, and comprising 92 parts by weight of hydrogen chloride, 68 parts by weight of water vapor and 176 parts by weight of inert gases (nitrogen), is introduced into 55% by weight sulfuric acid at a temperature of 125° C. The sulfuric acid is located in a lined container 1, which communicates, by way of an overflow, with an evaporator 2 heated by a submerged burner. Arranged above the container is a plate cooler 3 made of graphite, in which the gases ascending from the 55% by weight sulfuric acid are freed from the water by means of 69% by weight sulfuric acid flowing in counter-current. The overflows from plate to plate are provided with bubble caps in order to effect a better exchange of substance. The heat generated (heat of condensation and dilution as well as sensible heat of the gases) is dissipated by water cooling. If the quantity of heat dissipated is such that the temperature at the head of the cooler is 60° or below when 268 parts by weight of 69% by weight sulfuric acid is supplied, then the water is practically completely extracted from the gas mixture. For this purpose, with 1000 cubic metres of decomposition gas (at N.T.P.), at least 200,000 kcal. of heat must be dissipated. The acid with an $H_2SO_4$ content of 55% by weight overflowing into evaporator 2, containing the submerged burner or immersion heater, is concentrated to 69% by weight, 68 parts by weight of water being evaporated and conducted off via line 8. Air and fuel such as bunker oil are supplied to the heater via lines 6 and 7. The concentrated acid so obtained is thereafter cooled to 50° C. in the container 4 and is clarified in a concentrator 5, by deposition of the iron sulfate monohydrate formed from iron oxide dust and recovered via line 9, in order that the clarified acid may once again be supplied to the head of the plate cooler via overflow to container 10 and recycle pump 11. The HCl content in the hot 55% by weight acid flowing to the immersion heater evaporator is 0.05% by weight.

*Example 2*

With the same arrangement as in Example 1, the head temperature is maintained at 70° C. in the absorption stage by dissipating less heat. The discharging gas mixture then also contains, in addition to the inert gas fraction, 4% by weight of water, based on hydrogen chloride. When the head temperature is 80° C., 9% by weight of water is contained in the discharging gas.

*Example 3*

Using the same arrangement as in Example 1, the quantity of heat to be dissipated in the absorption apparatus is reduced by 11%, if the quantity of 69% by weight acid conducted in circulation is such that the $H_2SO_4$ content of sulfuric acid supplied to the immersion heater evaporator is 60% by weight. This corresponds to a quantity of acid which is 70% higher than that used in Example 1. Alternatively, when the $H_2SO_4$ concentration of the sulfuric acid discharging from the retort 1 is 65% by weight, the quantity of heat to be dissipated in the absorption stage is reduced by 52%, while the quantity of circulating acid is increased by 313% by weight.

We claim:
1. Process for drying gases containing hydrogen chloride by contact with semi-concentrated sulfuric acid, which comprises conducting the hydrogen chloride containing gas in counter-current contact with semi-concentrated sulfuric acid in an absorption stage, in which the concentration of the sulfuric acid entering such absorption stage is about 65 to 70% by weight $H_2SO_4$ and the concentration of the sulfuric acid discharging from such absorption stage is about 55 to 65% by weight $H_2SO_4$, dissipating the heat evolved during the absorption stage contact so that the temperature of the unabsorbed gas at the end of the absorption stage contact amounts to about 15 to 60° C. while the temperature of the discharging sulfuric acid from such absorption stage is about 115 to 150° C.

2. Process according to claim 1 wherein the discharging sulfuric acid is recycled to said absorption stage after reconcentration and cooling.

3. Process according to claim 2 wherein the concentration of the sulfuric acid entering the absorption stage amounts to 68% by weight $H_2SO_4$.

4. Process according to claim 2 wherein the temperature of the unabsorbed gas at the end of the absorption stage contact amounts to 60° C.

5. Process according to claim 4 wherein the dissipation of the heat evolved during the absorption stage is effected at least in part with sulfuric acid cooled to a temperature of between 60 to 150° C.

6. Process according to claim 4 wherein the concentration of the sulfuric acid entering the absorption stage amounts to 69% by weight $H_2SO_4$.

References Cited by the Examiner

UNITED STATES PATENTS

| | | | |
|---|---|---|---|
| 1,847,845 | 1/1928 | Mullen | 55—29 |
| 2,330,114 | 7/1936 | De Jahn | 23—219 |
| 3,201,201 | 8/1965 | Van Dijk et al. | 55—71 |

REUBEN FRIEDMAN, *Primary Examiner.*

R. W. BURKS, *Assistant Examiner.*